US008823932B2

(12) United States Patent
Comstock, II et al.

(10) Patent No.: US 8,823,932 B2
(45) Date of Patent: Sep. 2, 2014

(54) MULTI FIELD OF VIEW HYPERSPECTRAL IMAGING DEVICE AND METHOD FOR USING SAME

(75) Inventors: Lovell E Comstock, II, Charlestown, NH (US); Richard L Wiggins, Keene, NH (US)

(73) Assignee: Corning Incorporated, Corning, NY (US)

( * ) Notice: Subject to any disclaimer, the term of this patent is extended or adjusted under 35 U.S.C. 154(b) by 330 days.

(21) Appl. No.: 13/399,303

(22) Filed: Feb. 17, 2012

(65) Prior Publication Data

US 2012/0250016 A1 Oct. 4, 2012

Related U.S. Application Data

(60) Provisional application No. 61/471,393, filed on Apr. 4, 2011.

(51) Int. Cl.
*G01J 3/28* (2006.01)
*G01J 3/02* (2006.01)
*G01J 3/04* (2006.01)
*G01J 3/18* (2006.01)

(52) U.S. Cl.
CPC ............ *G01J 3/0289* (2013.01); *G01J 3/2823* (2013.01); *G01J 3/04* (2013.01); *G01J 3/18* (2013.01); *G01J 3/0232* (2013.01); *G01J 3/0294* (2013.01); *G01J 3/0264* (2013.01)
USPC ........................................................ 356/328

(58) Field of Classification Search
CPC ......... G01J 3/02; G01J 3/0208; G01J 3/2823; G01J 3/18; G01J 3/04; G01J 3/021; G01J 3/0294; G01J 3/0291; G01J 3/0218; G01J 3/0256; G01J 3/0259; G01J 3/2803; G01J 3/36; G01J 2003/1828; G01J 2003/2866; G01J 3/0202; G01J 3/02; G01J 3/0229; G01J 3/0237; G01J 3/024; G01J 3/0264; G01J 3/0297; G01J 3/2846; G01J 3/42; G01J 3/50; G03B 15/006; G06K 9/0063
USPC ......................................... 356/300–334, 618
See application file for complete search history.

(56) References Cited

U.S. PATENT DOCUMENTS 3,748,015 A    7/1973  Offner
4,259,014 A  *  3/1981  Talmi ............................ 356/328

(Continued)

FOREIGN PATENT DOCUMENTS

JP         6-241897          2/1994
WO    WO 2008129552 A1  *  10/2008  ............. G02B 13/06

OTHER PUBLICATIONS

Patent Abstract of JP06241897.

(Continued)

*Primary Examiner* — Kara E Geisel
*Assistant Examiner* — Violeta A Prieto
(74) *Attorney, Agent, or Firm* — Kevin L. Bray; Timothy M. Schaeberle (57) ABSTRACT

A multi field of view hyperspectral imaging device and method for using the same which can be used in many applications including short wavelength infrared (SWIR) and long-wavelength infrared (LWIR) applications are presented herein. In one embodiment, the multi field of view hyperspectral imaging device comprises multiple fore optics, multiple fold mirrors, a slit including a multiple openings, a spectrometer, and a 2-dimensional detector.

28 Claims, 11 Drawing Sheets

(56) References Cited

U.S. PATENT DOCUMENTS

| | | | |
|---|---|---|---|
| 4,494,872 A * | 1/1985 | Busch | 356/328 |
| 4,566,792 A * | 1/1986 | Suzuki | 356/319 |
| 4,983,039 A * | 1/1991 | Harada et al. | 356/328 |
| 5,049,740 A * | 9/1991 | Pines et al. | 250/235 |
| 5,276,321 A * | 1/1994 | Chang et al. | 250/226 |
| 5,768,040 A | 6/1998 | Macenka et al. | |
| 5,936,771 A * | 8/1999 | Cooper | 359/618 |
| 6,008,492 A | 12/1999 | Slater et al. | |
| 6,100,974 A | 8/2000 | Reininger | |
| 6,104,488 A * | 8/2000 | LeVan | 356/328 |
| 6,122,051 A | 9/2000 | Ansley et al. | |
| 6,734,966 B2 * | 5/2004 | McCarthy | 356/328 |
| 6,870,619 B1 * | 3/2005 | Tenhunen et al. | 356/330 |
| 7,382,498 B1 | 6/2008 | Cook | |
| 7,386,226 B2 * | 6/2008 | Miyoshi et al. | 396/89 |
| 7,456,940 B2 * | 11/2008 | Crow et al. | 356/73 |
| 7,518,722 B2 | 4/2009 | Julian et al. | |
| 7,528,943 B2 * | 5/2009 | Brown et al. | 356/237.4 |
| 7,817,274 B2 | 10/2010 | Zhang | |
| 8,174,693 B1 * | 5/2012 | Matthews | 356/326 |
| 2005/0001168 A1 * | 1/2005 | Amon et al. | 250/353 |
| 2005/0270528 A1 | 12/2005 | Geshwind et al. | |
| 2006/0208193 A1 * | 9/2006 | Bodkin | 250/353 |
| 2007/0252989 A1 | 11/2007 | Comstock | |
| 2007/0274714 A1 * | 11/2007 | Achal et al. | 398/43 |
| 2008/0024871 A1 | 1/2008 | Achal et al. | |
| 2009/0237657 A1 | 9/2009 | Warren | |
| 2010/0283842 A1 * | 11/2010 | Guissin et al. | 348/68 |

OTHER PUBLICATIONS

PCT/US2012/030643 Search Report.

Cobb et al; "Innovative Manufacturing and Test Technolgies for Imaging Hyperspectral Spectrometers"; Proc. of SPIE, vol. 6233; 9 Pages.

Dyson et al; "Unit Magnification Optical System Without Seidel Aberrations"; Journal of the Optical Society of America, vol. 49, No. 7, Jul. 1959, p. 713-716.

Mouroulis et al; "Convex Grating Types for Concentric Imaging Spectrometers"; Applied Optics, vol. 37, No. 31, pp. 7200-7209, Nov. 1998.

Warren et al; "Dyson Spectrometers for High-Performance Infrared Applications"; Optical Engineering, 47 (10), 103601-1-103601-9, Oct. 2008.

* cited by examiner

MULTI FIELD OF VIEW HYPERSPECTRAL IMAGING DEVICE AND METHOD FOR USING SAME

PRIORITY

This application claims the benefit of priority under 35 U.S.C. §119 of U.S. Provisional Application Ser. No. 61/471,393 filed on Apr. 4, 2011 the content of which is relied upon and incorporated herein by reference in its entirety.

TECHNICAL FIELD

The present invention relates to the hyperspectral imaging field and, in particular, to a multi field of view hyperspectral imaging device and method for using the multi field of view hyperspectral imaging device.

BACKGROUND

A spectrometer is a device which receives a light signal as an input and produces as an output a light signal which is spread out in space according to the different wavelength components, or colors, of the input light signal. A detector attached to the spectrometer analyzes the output signal, called the spectrum, to quantify the amount of each wavelength component which is present in the input signal. One specific type of spectrometer is known as an Offner spectrometer which can be used to produce images of a remote object over a contiguous range of narrow spectral bands. This type of imaging is known as hyperspectral imaging and has recently emerged as an important part of the military/aerospace solution to airborne and spaceborne reconnaissance and remote sensing. Basically, the hyperspectral imaging system utilizes an Offner spectrometer and an advanced data processing technology to produce imagery with embedded spectral signature data. This signature data is useful in a wide-variety of applications such as target designation/recognition, missile plume identification and mine detection (for example). In addition, the hyperspectral imaging system can be used in a wide-variety of commercial applications such as cancer detection, environmental monitoring, agricultural monitoring and mineral exploration. An exemplary conventional hyperspectral imaging system which incorporates an Offner spectrometer is discussed below with respect to FIGS. 1A-1B (PRIOR ART).

Figure 1A:
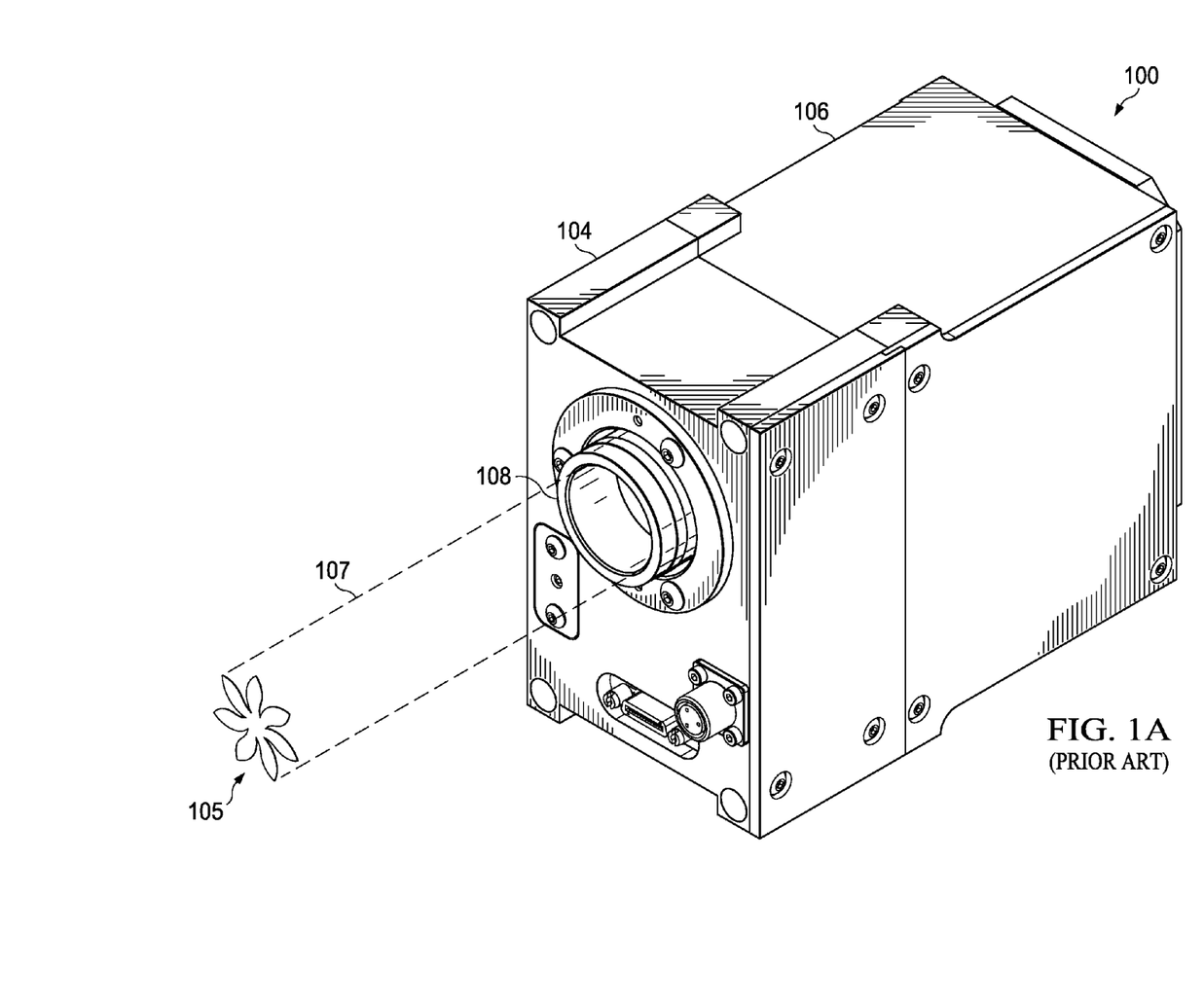
FIGS. 1A-1B (PRIOR ART) illustrate an exemplary conventional hyperspectral imaging system for imaging a remote object at a low resolution in SWIR and LWIR applications.
Figure 1B:
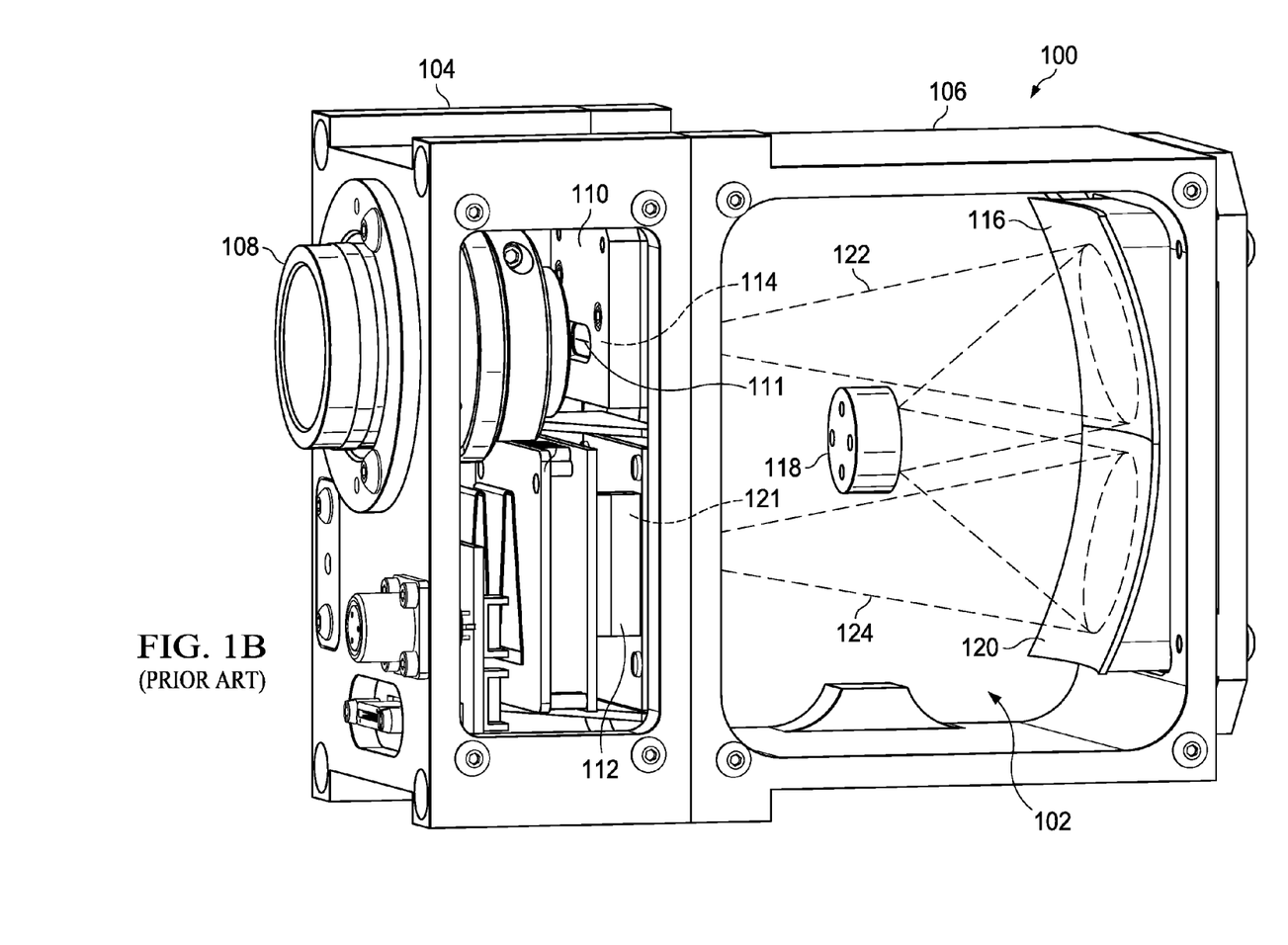

Referring to FIGS. 1A-1B (PRIOR ART), there are shown two perspective views of an exemplary conventional hyperspectral imaging system 100 which incorporates an Offner spectrometer 102. The hyperspectral imaging system 100 includes a first housing 104 which is positioned next to and attached to a second housing 106 (see FIG. 1A). The first housing 104 encloses and protects a single fore optic 108, a slit 110 (with a single opening 111), and a 2-dimensional detector 112. The second housing 106 encloses and protects the Offner spectrometer 102 (see FIG. 1B). In this example, the Offner spectrometer 102 is a one-to-one optical relay which includes an entrance opening 114 (can be same as or adjacent to slit's opening 111), a first mirror 116, a diffraction grating 118, a second mirror 120 and an exit opening 121 (positioned next to the 2-dimensional detector 112). It should be appreciated that for clarity the description provided about the conventional hyperspectral imaging system 100 omits certain details and components which are well known in the industry and are not necessary to explain and understand the present invention.

The conventional hyperspectral imaging system 100 operates to produce images of a remote object 105 over a contiguous range of narrow spectral bands when the fore optic 108 receives a beam 107 from the remote object 105 and directs the beam 107 to the slit's single opening 111 which outputs a trimmed beam 122 (slice of the image) to the Offner spectrometer 102 which diffracts the trimmed beam 122 and forwards the diffracted beam 124 to the detector 112 (see FIGS. 1A and 1B). In particular, the slit's single opening 111 outputs the trimmed beam 122 which passes through the entrance opening 114 (if present) and is received at the first mirror 116 (spherical mirror 116) which reflects the trimmed beam 122 towards the diffraction grating 118. The diffraction grating 118 receives the trimmed beam 122 and diffracts and reflects the diffracted beam 124 to the second mirror 120 (spherical mirror 120). The second mirror 120 receives the diffracted beam 124 and reflects the diffracted beam 124 through the exit opening 121 to the detector 112. The detector 112 (e.g., two dimensional focal plane array (FPA) 112) receives and processes the diffracted beam 124 which passed through the spectrometer's exit opening 121.

Figure 2:
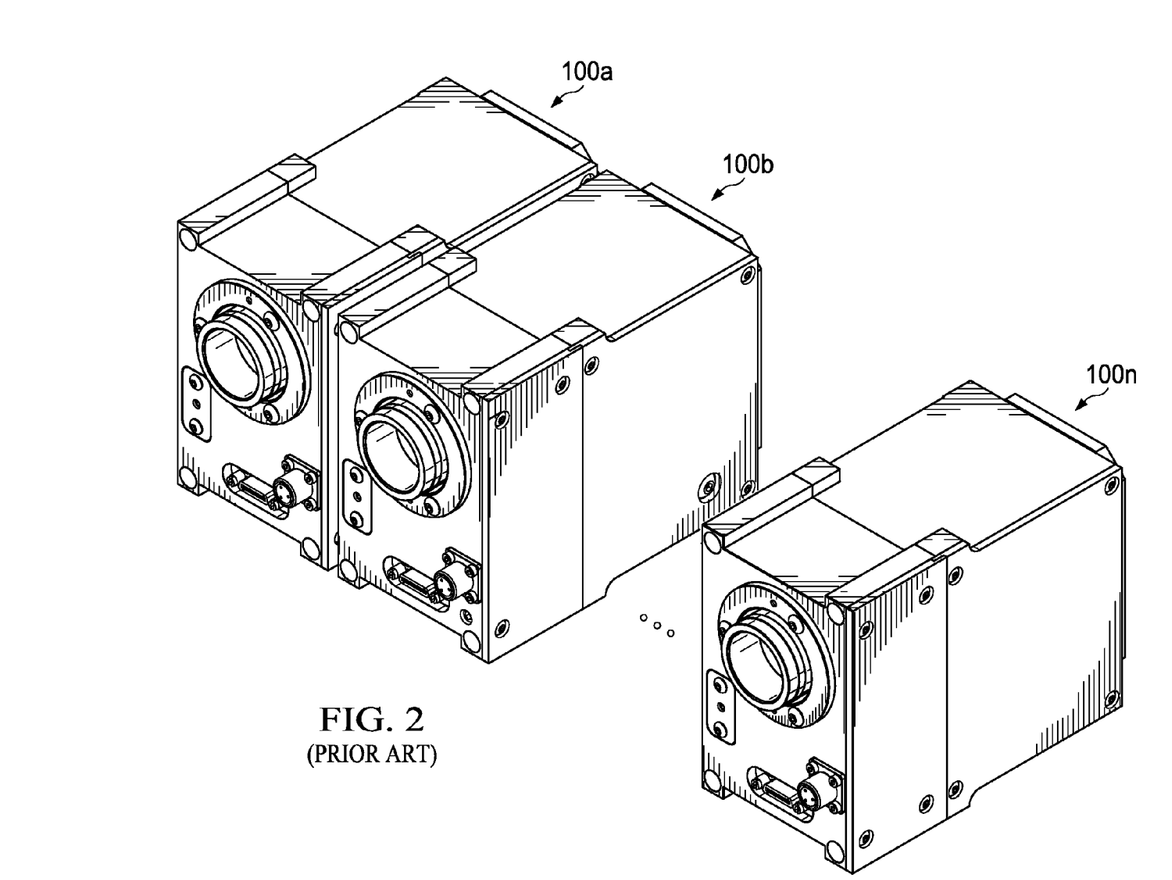
FIG. 2 (PRIOR ART) illustrates multiple conventional hyperspectral imaging systems located side-by-side such that the "linear field of view" of each conventional hyperspectral imaging system is aligned end-to-end with one another to image a remote object at a high resolution in SWIR and LWIR application.

This type of hyperspectral imaging system 100 generally works well in most applications however in the short wave infrared (SWIR) wavelength band (0.75-2.5 µm) and the long-wavelength infrared (LWIR) wavelength band (7-15 µm) the current commercially available detector 112 has a limited number of pixels which can be used to image when compared to the commercially available detectors associated with the visible wavelength band. In particular, the current commercially available detector 112 has a limited number of pixels that can be used to image the remote object 105 in a two dimensional focal plane which is composed of a spatial direction and a spectral direction. Thus, to improve the spatial field coverage at a particular resolution, multiple conventional hyperspectral imaging systems 100a, 100b ... 100n are currently located side-by-side such that the "linear field of view" of each conventional hyperspectral imaging system 100a, 100b ... 100n are aligned end-to-end with one another to image the remote object 105 (not shown) at a particular resolution as shown in FIG. 2 (PRIOR ART). This solution is prohibitive for many applications including the SWIR and LWIR applications due to the space, weight, power constraints, and costs of the multiple detectors (which are very expensive), coolers, spectrometers etc.

SUMMARY

A multi field of view hyperspectral imaging device and a method for using the same which overcomes the shortcomings of the prior art and which can be used in many applications including the SWIR and LWIR applications are described in the independent claims of the present application. Advantageous embodiments of the multi field of view hyperspectral imaging device and the method for using the same are described in the dependent claims.

In one aspect, the present invention provides a multi field of view hyperspectral imaging device for imaging a remote object. The multi field of view hyperspectral imaging device comprises: (a) a first fore optic that receives a first image from a first portion of the remote object; (b) a second fore optic that receives a second image from a second portion of the remote object; (c) a first fold mirror; (d) a second fold mirror; (e) a slit including a first opening and a second opening, wherein the first fore optic is associated with the first fold mirror which receives the first image from the first fore optic and directs the first image to the first opening which outputs a trimmed first image, and wherein the second fore optic is associated with the second fold mirror which receives the second image from the second fore optic and directs the second image to the second opening which outputs a trimmed second image; (f) a spectrometer positioned to receive the trimmed first image from the first opening and output a diffracted first image and to receive the trimmed second image from the second opening and output a diffracted second image; and (g) a 2-dimensional detector positioned to receive the diffracted first image and the diffracted second image at a final focal plane from the spectrometer and then output a 2-dimensional image of the diffracted first image and the diffracted second image.

In another aspect, the present invention provides a method for using a multi field of view hyperspectral imaging device to image a remote object. The method comprising the steps of: (a) providing the multi field of view hyperspectral imaging device which comprises: (i) a first fore optic that receives a first image from a first portion of the remote object; (ii) a second fore optic that receives a second image from a second portion of the remote object; (iii) a first fold mirror; (iv) a second fold mirror; (v) a slit including a first opening and a second opening, wherein the first fore optic is associated with the first fold mirror which receives the first image from the first fore optic and directs the first image to the first opening which outputs a trimmed first image, and wherein the second fore optic is associated with the second fold mirror which receives the second image from the second fore optic and directs the second image to the second opening which outputs a trimmed second image; (vi) a spectrometer positioned to receive the trimmed first image from the first opening and output a diffracted first image and to receive the trimmed second image from the second opening and output a diffracted second image; and (vii) a 2-dimensional detector positioned to receive the diffracted first image and the diffracted second image at a final focal plane from the spectrometer and then output a 2-dimensional image of the diffracted first image and the diffracted second image; and (b) controlling the first fore optic and the second fore optic to obtain the 2-dimensional image of the diffracted first image and the diffracted second image.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF DRAWINGS

A more complete understanding of the present invention may be had by reference to the following detailed description when taken in conjunction with the accompanying drawings wherein.

DETAILED DESCRIPTION

Figure 3A:
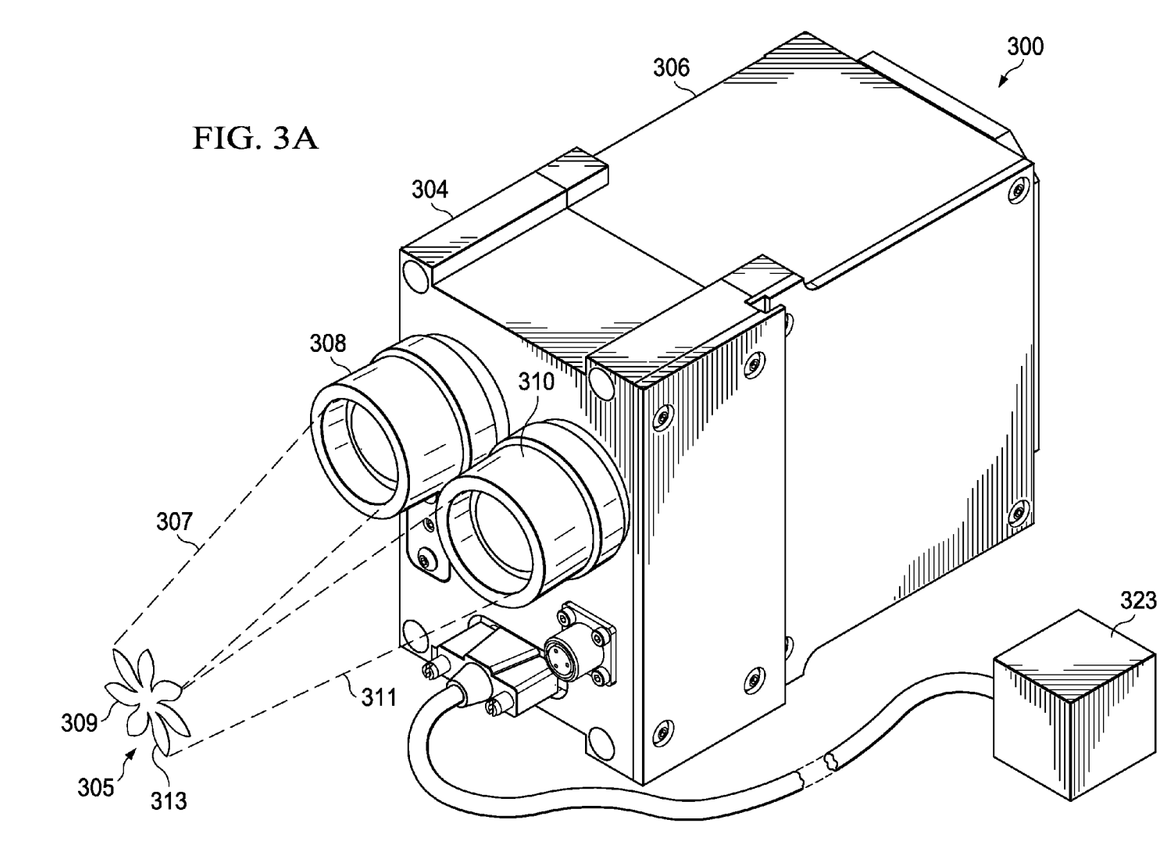
FIGS. 3A-3C illustrate an exemplary multi field of view hyperspectral imaging system for imaging a remote object in accordance with an embodiment of the present invention.
Figure 3B:
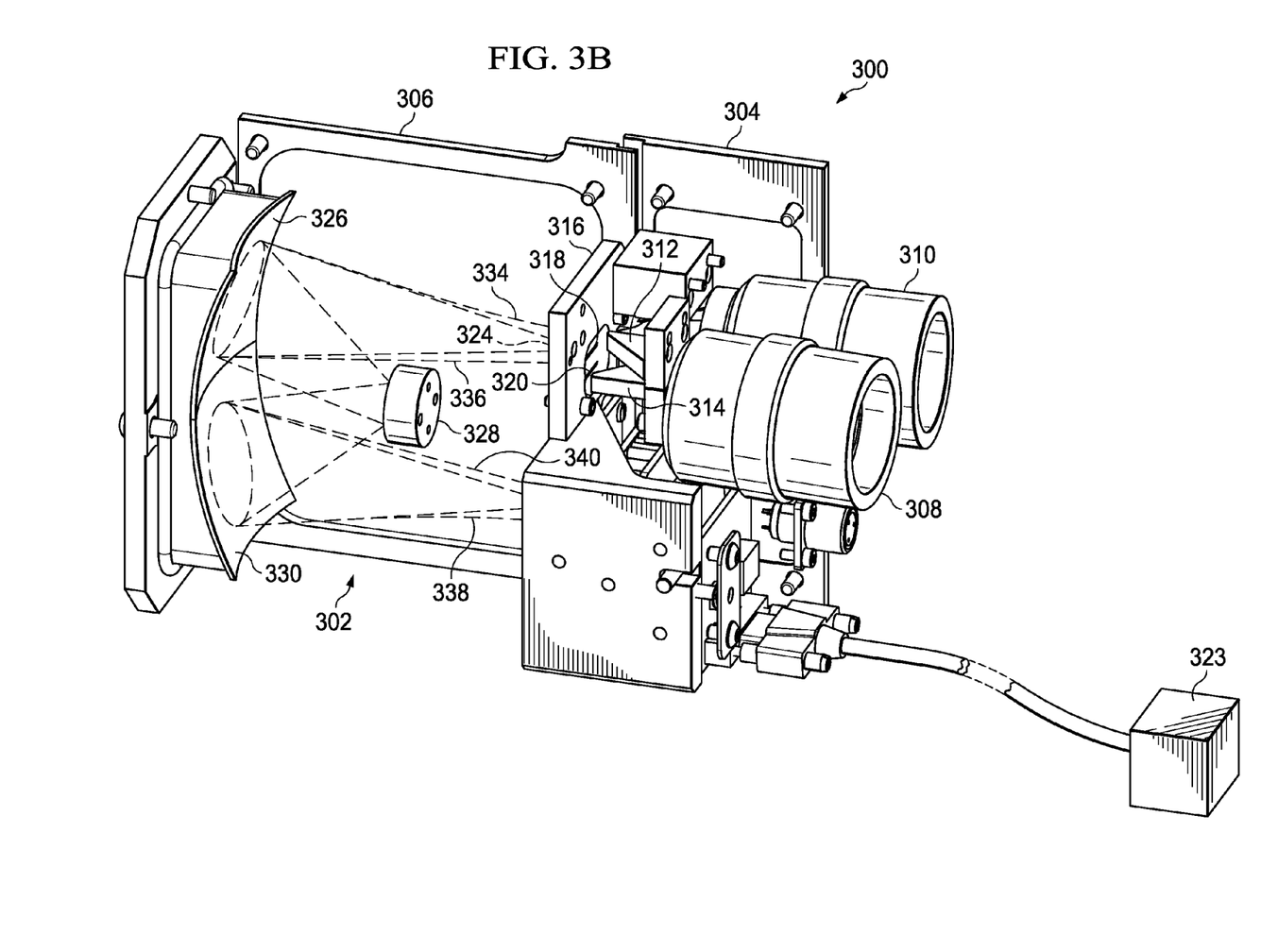
Figure 3C:
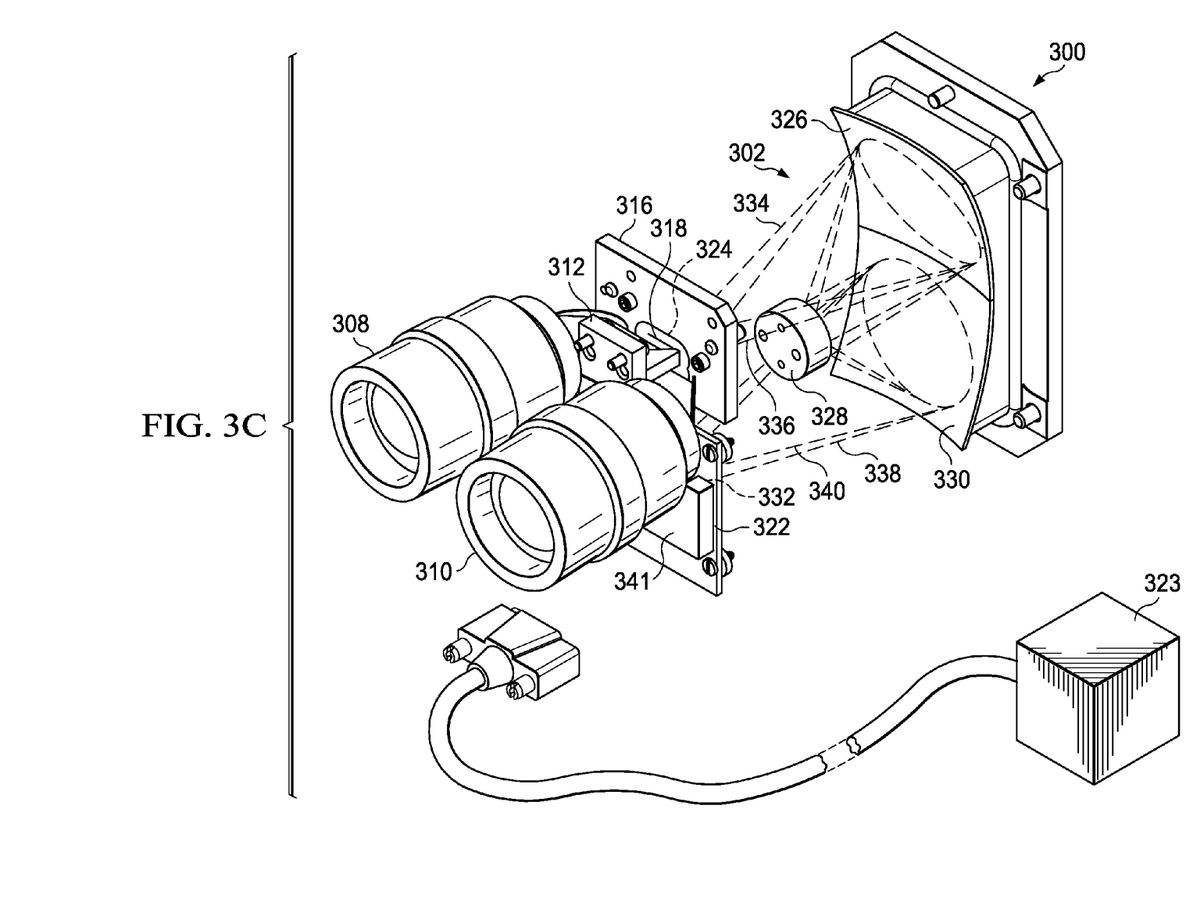

Referring to FIGS. 3A-3C, there are shown three perspective views of an exemplary multi field of view hyperspectral imaging system 300 for imaging a remote object 305 in accordance with an embodiment of the present invention. The hyperspectral imaging system 300 includes a first housing 304 which is positioned next to and attached to a second housing 306 (see FIG. 3A). The first housing 304 encloses and protects a first fore optic 308, a second fore optic 310, a first fold mirror 312, a second fold mirror 314, a slit 316 (which includes a first opening 318 and a second opening 320), and a 2-dimensional detector 322 (see FIGS. 3B-3C). The second housing 306 encloses and protects a spectrometer 302 (e.g., Offner spectrometer 302 (shown), Dyson spectrometer 302) (see FIGS. 3B-3C). In this example, the spectrometer 302 is a one-to-one optical relay including an entrance opening 324 (can be same as or adjacent to slit's openings 318 and 320), a first mirror 326, a diffraction grating 328, a second mirror 330 and an exit opening 332 (positioned next to the 2-dimensional detector 322). The hyperspectral imaging system 300 may include a controller 323 which controls the operation of several components including the first fore optic 308, the second fore optic 310, and the 2-dimensional detector 322. It should be appreciated that for clarity the description provided about the hyperspectral imaging system 300 omits certain details and components which are well known in the industry and are not necessary to explain and understand the present invention.

The hyperspectral imaging system 300 operates to produce images of the remote object 305 over a contiguous range of narrow spectral bands when the first fore optic 308 receives a first image 307 (e.g., first beams 307) associated with a first portion 309 of the remote object 305 and the second fore optic 310 receives a second image 311 (e.g., second beams 311) associated with a second portion 313 of the remote object 305 (see FIG. 3A). The first fold mirror 312 receives the first image 307 from the first fore optic 308 and directs the first image 307 to the slit's first opening 318 which outputs a trimmed first image 334 (slice of the first image) (see FIGS. 3B-3C). The second fold mirror 314 receives the second image 311 from the second fore optic 310 and directs the second image 311 to the slit's second opening 320 which outputs a trimmed second image 336 (slice of the second image) (see FIGS. 3B-3C). The first and second fold mirrors 312 and 314 would be adjusted to align the two fields of view to one another prior to directing the first and second images 307 and 311 to the slit's openings 318 and 320.

The spectrometer 302 is positioned to receive the trimmed first and second images 334 and 336 from the slit's first and second openings 318 and 320 and output diffracted first and second images 338 and 340 to the 2-dimensional detector 322. In particular, the slit's first and second openings 318 and 320 output the trimmed first and second images 334 and 336 which pass through the entrance opening 324 (if present) to the first mirror 326 (spherical mirror 326) which reflects the trimmed first and second images 334 and 336 towards the diffraction grating 328. The diffraction grating 328 receives the trimmed first and second images 334 and 336 reflected from the first mirror 326 and outputs the diffracted first and second images 338 and 340 to the second mirror 330 (spherical mirror 330). The second mirror 330 receives the diffracted first and second images 338 and 340 from the diffraction grating 328 and reflects the diffracted first and second images 338 and 340 through the exit opening 332 to the 2-dimensional detector 322. The 2-dimensional detector 322 (e.g., 2-dimensional FPA 322) is positioned to receive the diffracted first image 338 and the diffracted second image 340 at a final focal plane 341 and then output a 2-dimensional image of the diffracted first image 338 and the diffracted second image 340 (e.g., see FIGS. 3C and 4E).

Figure 3D:
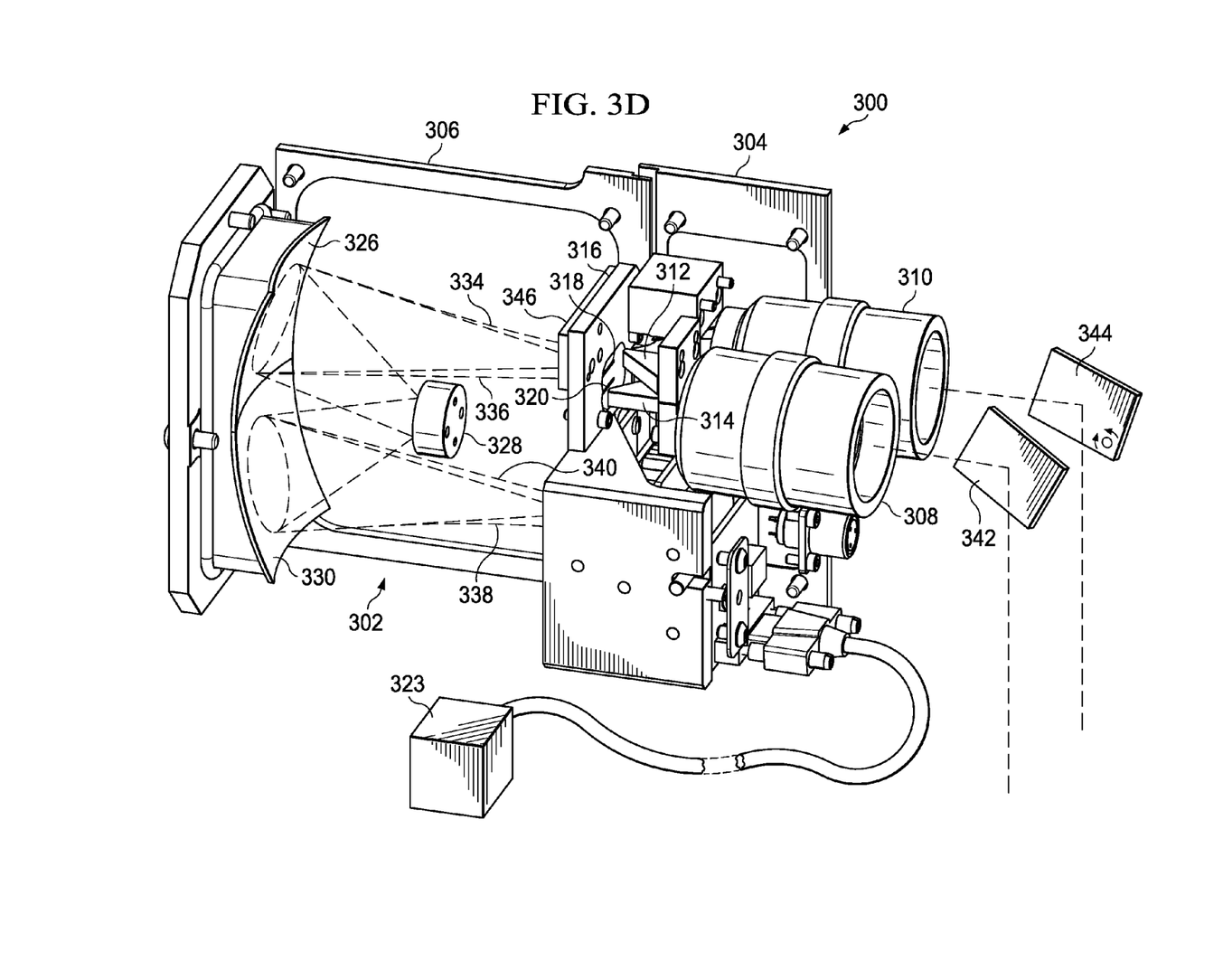
FIG. 3D illustrates an exemplary multi field of view hyperspectral imaging system similar to the one shown in FIGS. 3A-3C but also incorporating a shutter, a fixed pick-off mirror (associated with a first fore optic), and a moveable steering mirror (associated with a second fore optic) in accordance with an embodiment of the present invention.

In one set-up of the hyperspectral imaging system 300, the first fore optic 308 and the second fore optic 310 have different magnifications with respect to one another. For example, the first fore optic 308 can have a wide field of view and the second fore optic 310 can have a narrow field of view both of which are imaged onto the 2-dimensional detector 322. Plus, the first fore optic 308 may have positioned in front thereof a fixed pick-off mirror 342 and the second fore optic 310 may have positioned in front thereof a fast moveable steering mirror 344 (see FIG. 3D). This particular set-up can be used such that the wider field of view image "leads" in a time domain, to look for a specific spectral signature. If an area of interest is found, then the fast moveable steering mirror 344 can position the narrow field of view image to the area of interest. In an application like this, one or more shutters 346 can also be incorporated to further improve the signal-to-noise ratio in the image, by activating only one field of view at a time from either the first fore optic 308 or the second fore optic 310 (see FIG. 3D). In this example, one shutter 346 is shown located behind the slit 316 and moveable to cover anyone of the slit's openings 318 and 320. The controller 323 would control the movement of the fast moveable steering mirror 344 and the shutter 346. It should be appreciated that for clarity the description and drawing provided omit certain details about components used to support the fixed pick-off mirror 342, the fast moveable steering mirror 344, and the shutter 346.

Figures 4A, 4B, 4C, 4E:
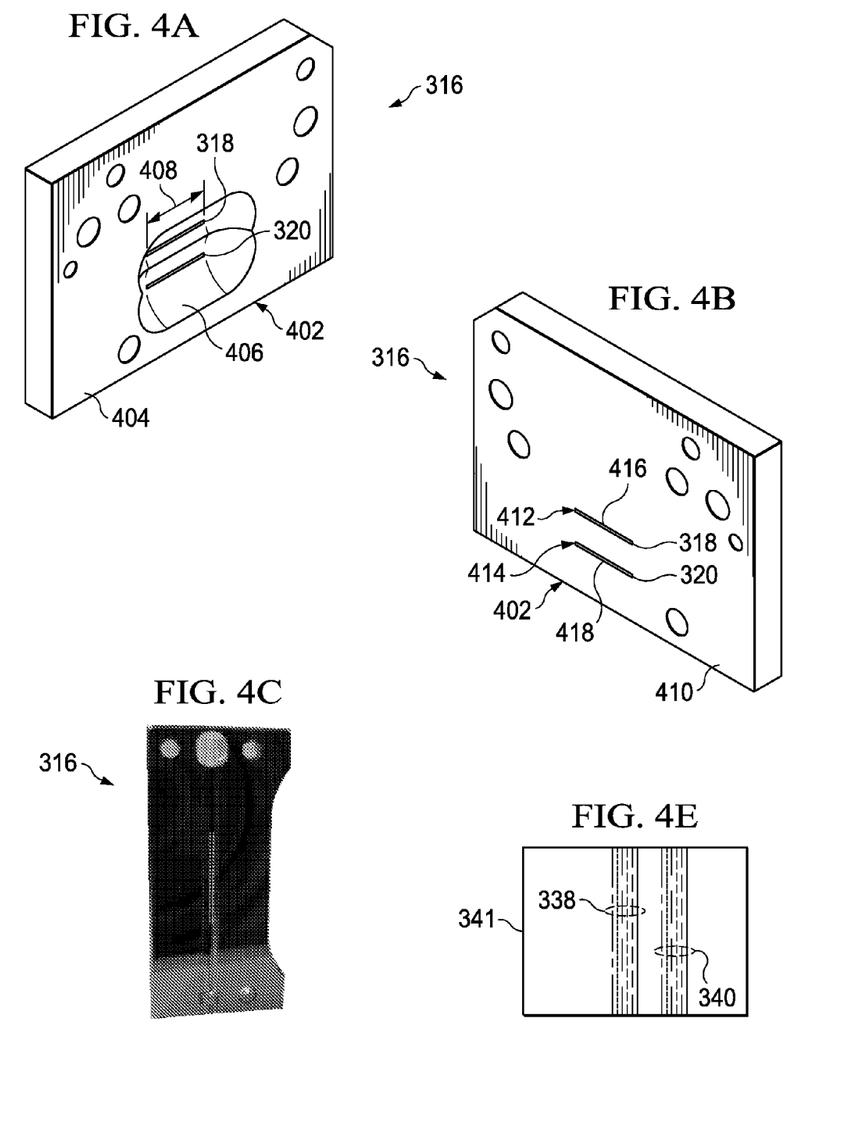
FIGS. 4A-4E are diagrams of an exemplary slit that can be incorporated within the multi field of view hyperspectral imaging systems shown in FIGS. 3A-3D in accordance with an embodiment of the present invention.
Figure 4D:
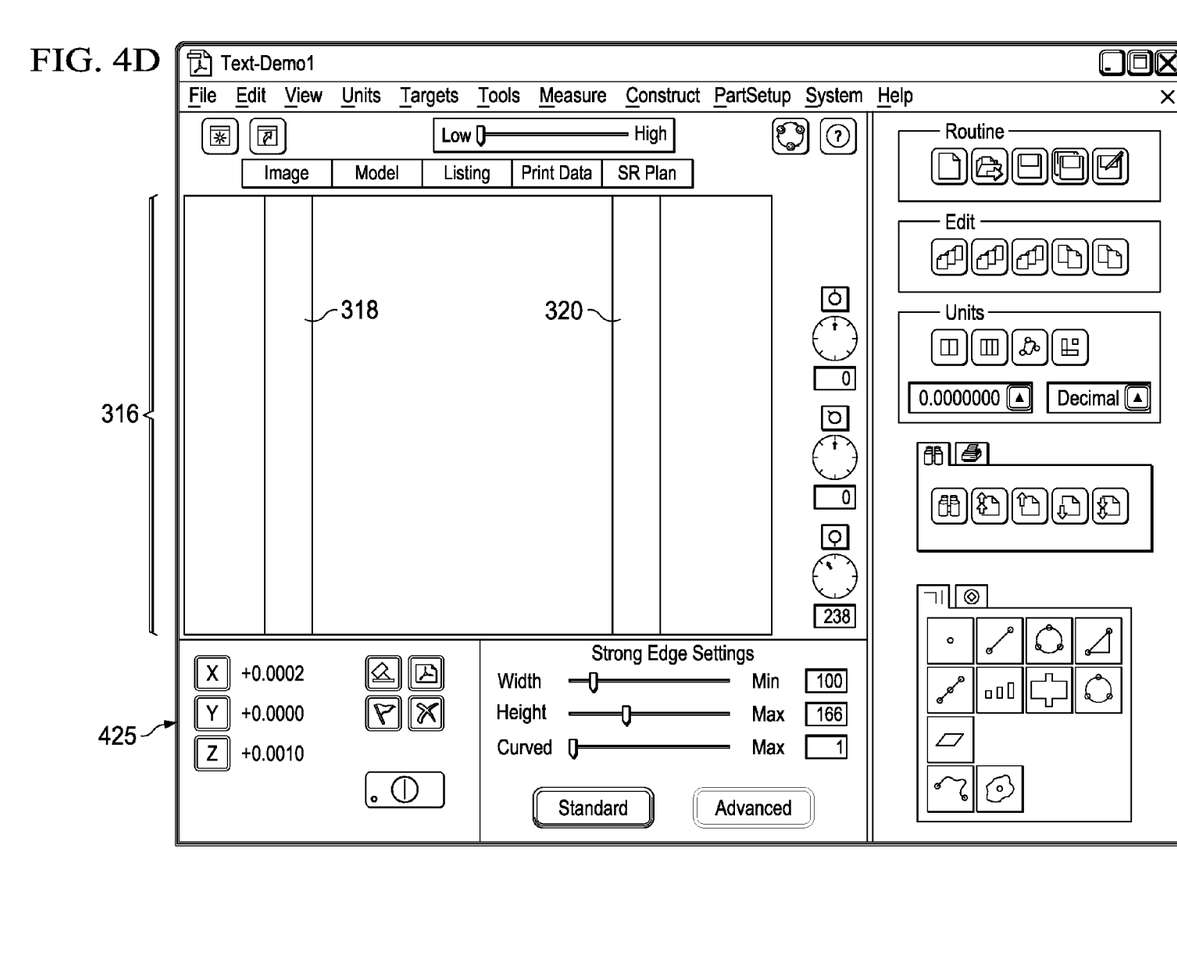

In another set-up of the hyperspectral imaging system 300, the first fore optic 308 and the second fore optic 310 have the same magnifications. This particular set-up can be used such that one field of view (associated with the first fore optic 308) can be staggered in a time domain with respect to the other field of view (associated with the second fore optic 310) to implement various "scene change" applications. For example, one scene change application can involve tracking of certain vehicles Referring to FIGS. 4A-4E, there are several diagrams of an exemplary slit 316 that can be incorporated within the multi field of view hyperspectral imaging system 300 in accordance with an embodiment of the present invention. In FIGS. 4A-4B, there are respectively shown front and back perspective views of the slit 316 which includes a substrate 402 within which there is extending there through the first opening 318 and the second opening 320. In one example, the slit 316 is made from a diamond machinable substrate 402 (e.g., cooper, nickel, aluminum, silicon, germanium, gold, calcium fluoride) having a first side 404 which has a portion 406 removed therefrom by a diamond ball nose milling process (for example) to define the length of a slit aperture 408 (see FIG. 4A). The diamond machinable substrate 402 also has a second side 410 which has two portions 412 and 414 removed therefrom by a diamond fly-cutting process (for example) to form two grooves 416 and 418 which breaks through to the first side 404 to form the two openings 318 and 320 (see FIG. 4B). These and other machining techniques permit the manufacturing of the slit 316 in a common substrate to sub-micron tolerances. These machining techniques will also be an advantage in manufacturing the slit's openings 318 and 320 so they are precisely aligned to optimize the performance of the spectrometer 302 which requires precise alignment between the slit 316, the diffraction grating 328, and the 2-dimensional detector 322 (e.g., less than $\frac{1}{10}$ of a pixel at the 2-dimensional detector 322). FIGS. 4C-4D respectively illustrate a photograph of an exemplary monolithic knife edge dual slit 316 and a diagram of a computer screen 425 illustrating a 400x image of a portion of the exemplary monolithic knife edge dual slit 316.

The exemplary slit 316 has two openings 318 and 320 which are separated from one another by more than a diffracted field at the spectrometer's final focal plane 341 (assuming a one-to-one optical relay spectrometer 302) (see FIG. 4E). In particular, the slit's first and second openings 318 and 320 each output trimmed images 334 and 336 which are separated from one another by the spectral band of interest so that the diffracted first and second images 338 and 340 are separated from one another when imaged on the final focal plane 341 at the 2-dimensional detector 322 (see FIG. 4E). Furthermore, the diffraction grating 328 can be configured with a diffraction efficiency that prevents an overlap of the diffracted first image 338 and the diffracted second image 340. In addition, the 2-dimensional detector 322 can incorporate band pass filters, order sorting filters, or other techniques to prevent the overlap of the adjacent diffracted first image 338 and the diffracted second image 340.

Figure 5:
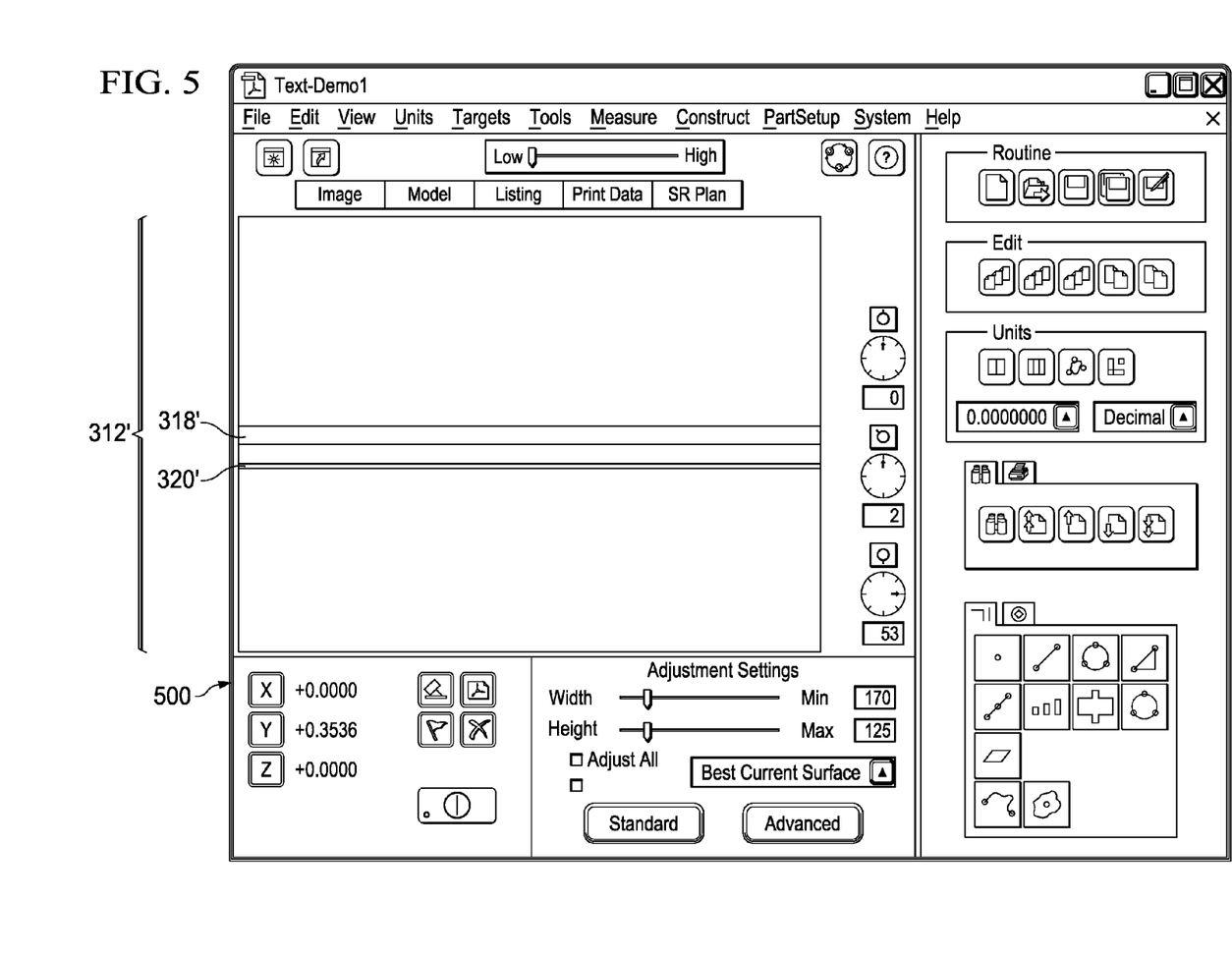
FIG. 5 illustrates another exemplary slit that can be incorporated within the multi field of view hyperspectral imaging systems shown in FIGS. 3A-3D in accordance with an embodiment of the present invention.

Referring to FIG. 5, there is a diagram of a computer screen 500 illustrating a portion of another exemplary slit 316' that can be incorporated within the multi field of view hyperspectral imaging system 300 in accordance with an embodiment of the present invention. The exemplary slit 316' is the same as the aforementioned slit 316 except that the slit 316' has two openings 318' and 320' with different widths where the first opening 318' is wider than the second opening 320'. In this example, the first opening 318' has a width 322' of 40 µm and the second opening 320' has a width 324' of 10 µm while both openings 318' and 320' are 11 mm long. The exemplary slit's two openings 318' and 320' are separated from one another by more than a diffracted field at the spectrometer's final focal plane 341 (assuming a one-to-one optical relay spectrometer 302). In particular, the slit's first and second openings 318' and 320' each output trimmed images 334 and 336 which are separated from one another by the spectral band of interest so that the diffracted first and second images 338 and 340 are separated from one another when imaged on the final focal plane 341 at the 2-dimensional detector 322 (e.g., see FIG. 4E). Alternatively, the aforementioned slit's 316 and 316' could have more than two openings. In this case, the multi field of view hyperspectral imaging system 300 would have more than two fore optics and more than two fold mirrors an example of which is discussed below with respect to FIG. 6.

Figure 6:
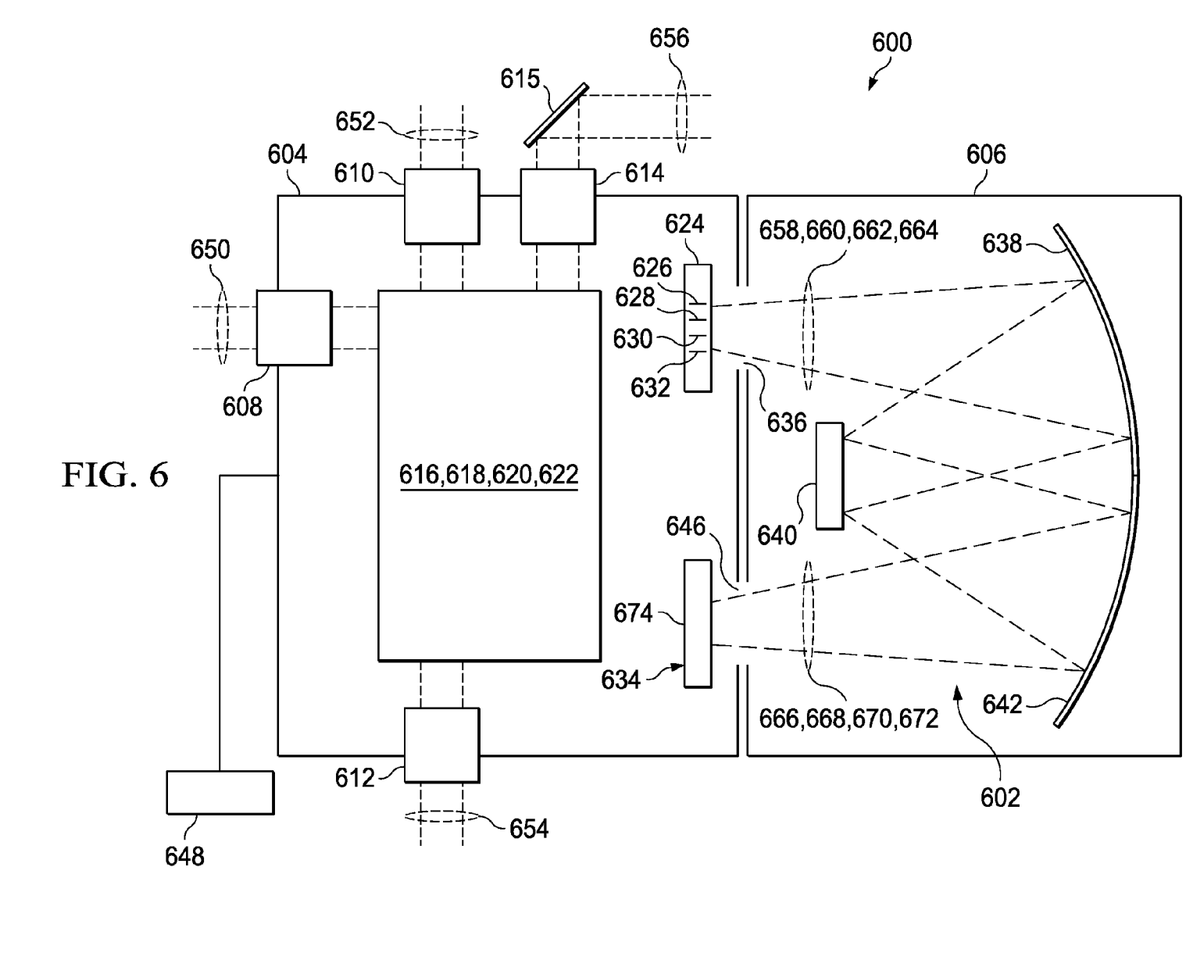
FIG. 6 illustrates another exemplary multi field of view hyperspectral imaging system for imaging one or more remote objects in accordance with another embodiment of the present invention.

Referring to FIG. 6, there is a diagram of another exemplary multi field of view hyperspectral imaging system 600 for imaging one or more remote objects (not shown) in accordance with another embodiment of the present invention. The hyperspectral imaging system 600 includes a first housing 604 which is positioned next to and attached to a second housing 606. The first housing 604 encloses and protects a first fore optic 608, a second fore optic 610, a third fore optic 612, a fourth fore optic 614 (associated with a pick-off mirror 615), a first fold mirror 616, a second fold mirror 618, a third fold mirror 620, a fourth fold mirror 622, a slit 624 (which includes a first opening 626, a second opening 628, a third opening 630, a fourth opening 632), and a 2-dimensional detector 634. The second housing 606 encloses and protects a spectrometer 602 (e.g., Offner spectrometer 602 (shown), Dyson spectrometer 602). In this example, the spectrometer 602 is a one-to-one optical relay including an entrance opening 636 (can be same as or adjacent to slit's openings 626, 628, 630 and 632), a first mirror 638, a diffraction grating 640, a second mirror 642, and an exit opening 646 (positioned next to the 2-dimensional detector 634). The hyperspectral imaging system 600 may include a controller 648 which controls the operation of several components including the fore optics 608, 610, 612 and 614, and the 2-dimensional detector 634. It should be appreciated that for clarity the description and drawing provided about the hyperspectral imaging system 600 omits certain details and components which are well known in the industry and are not necessary to explain and understand the present invention.

The hyperspectral imaging system 600 has four fore optics 608, 610, 612 and 614 each with 90 degrees field of view to cover 360 degrees and image remote object(s) (surveillance or transient events). In operation, the hyperspectral imaging system 600 operates to produce images of the remote object(s) over a contiguous range of narrow spectral bands when the first fore optic 608 receives a first image 650 (e.g., first beams 650) associated with a portion of the remote object(s), the second fore optic 608 receives a second image 652 (e.g., second beams 652) associated with another portion of the remote object(s), the third fore optic 612 receives a third image 654 (e.g., third beams 654) associated with another portion of the remote object(s), and the forth fore optic 614 receives a fourth image 656 (e.g., fourth beams 656) from the pick-off mirror 615 associated with yet another portion of the remote object(s). The first fold mirror 616 receives the first image 650 from the first fore optic 608 and directs the first image 650 to the slit's first opening 626 which outputs a trimmed first image 658 (slice of the first image 650). The second fold mirror 618 receives the second image 652 from the second fore optic 610 and directs the second image 652 to the slit's second opening 628 which outputs a trimmed second image 660 (slice of the second image 652). The third fold mirror 620 receives the third image 654 from the third fore optic 612 and directs the third image 654 to the slit's third opening 630 which outputs a trimmed third image 662 (slice of the third image 654). The fourth fold mirror 622 receives the fourth image 656 from the fourth fore optic 614 and directs the fourth image 656 to the slit's fourth opening 632 which outputs a trimmed fourth image 664 (slice of the fourth image 656). The fold mirrors 616, 618, 620 and 622 would be adjusted to align the four fields of view to one another prior to directing the images 650, 652, 654 and 656 to the slit's openings 626, 628, 630 and 632.

The spectrometer 602 is positioned to receive the trimmed images 658, 660, 662 and 664 from the slit's openings 626, 628, 630 and 632 and output diffracted images 666, 668, 670 and 672 to the 2-dimensional detector 634. In particular, the slit's openings 626, 628, 630 and 632 output the trimmed images 658, 660, 662 and 664 which passed through the entrance opening 636 (if present) to the first mirror 638 (spherical mirror 638) which reflects the trimmed images 658, 660, 662 and 664 towards the diffraction grating 640. The diffraction grating 640 receives the trimmed images 658, 660, 662 and 664 reflected from the first mirror 636 and outputs the diffracted images 666, 668, 670 and 672 to the second mirror 642 (spherical mirror 642). The second mirror 642 receives the diffracted images 666, 668, 670 and 672 from the diffraction grating 640 and reflects the diffracted images 666, 668, 670 and 672 through the exit opening 646 to the 2-dimensional detector 634. The 2-dimensional detector 634 (e.g., 2-dimensional FPA 634) is positioned to receive the diffracted images 666, 668, 670 and 672 at a final focal plane 674 and then output a 2-dimensional image of the diffracted images 666, 668, 670 and 672.

The hyperspectral imaging system 600 may incorporate fore optics 608, 610, 612 and 614 which have the same magnifications, different magnifications, or any combination of magnifications. If desired, the hyperspectral imaging system 600 may incorporate one or more fixed mirrors, fast moveable steering mirrors and shutters as described above with respect to hyperspectral imaging system 300. Furthermore, the hyperspectral imaging system 600 incorporates the slit 624 with openings 626, 628, 630 and 632 which are each separated from one another by more than a diffracted field at the spectrometer's final focal plane 674 (assuming a one-to-one optical relay spectrometer 602). The slit's openings 626, 628, 630 and 632 may have the same widths, different widths, or any desired combination of widths. Furthermore, the diffraction grating 640 can be configured with a diffraction efficiency that prevents an overlap of any of the diffracted images 666, 668, 670 and 672. In addition, the 2-dimensional detector 634 can incorporate band pass filters, order sorting filters, or other techniques to prevent the overlap of the adjacent diffracted images 666, 668, 670 and 672.

From the foregoing, one skilled in the art will appreciate that the aforementioned hyperspectral imaging systems 300 and 600 can be used in many types of applications including the SWIR and LWIR applications and thus address the aforementioned shortcomings associated with the prior art. To address these shortcomings, the hyperspectral imaging systems 300 and 600 take advantage of the available detector area which is not the case with the conventional hyperspectral imaging system 100 (for example). In particular, the conventional hyperspectral imaging system 100 does not take advantage of the full detector area in the spectral dimension and in many cases less than 20% of the available detector area is active and utilized. However, the hyperspectral imaging systems 300 and 600 are configured to take advantage of the available detector space by having an innovative diffraction grating design, image splitting techniques, and multiple fore optics which cover multiple hyperspectral fields of view in a single spectrometer. In addition, the hyperspectral imaging systems 300 and 600 can leverage the optical performance of many "semi-symmetric" spectrometers such as an Offner spectrometer and a Dyson spectrometer to cover extended fields in the spectral direction, but can also be applied to other refractive and reflective designs. An exemplary Dyson spectrometer which can be used instead of the Offner spectrometer 302 is described in the following documents: (1) J. Dyson, "Unit magnification optical system without Seidel aberrations," J. Opt. Soc. Am. 49, 713-716 (1959); (2) David W. Warren, David J. Gutierrez, and Eric R. Keim, "Dyson spectrometers for high-performance infrared applications", Optical Engineering/Volume 47/Issue 10, published online Oct. 14, 2008; and US Patent Publication No. 2009/0237657 (the contents of these documents are incorporated by reference herein). The hyperspectral imaging systems 300 and 600 also provide a significant cost reduction in equipment (detectors, spectrometers, coolers etc.), occupy significantly less volume, and require much less power when compared to the multiple conventional hyperspectral imaging system 100a, 100b . . . 100n (see FIG. 2).

Although multiple embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A multi field of view hyperspectral imaging device for imaging a remote object, the multi field of view hyperspectral imaging device comprising:
    a first fore optic that receives a first image from a first portion of the remote object;
    a second fore optic that receives a second image from a second portion of the remote object;
    a first fold mirror;
    a second fold mirror;
    a slit comprising a first opening and a second opening, wherein the first fore optic is associated with the first fold mirror which receives the first image from the first fore optic and directs the first image directly to the first opening which outputs a trimmed first image, and wherein the second fore optic is associated with the second fold mirror which receives the second image from the second fore optic and directs the second image directly to the second opening which outputs a trimmed second image;
    a spectrometer positioned to receive the trimmed first image from the first opening and output a diffracted first image and to receive the trimmed second image from the second opening and output a diffracted second image; and
    a 2-dimensional detector positioned to receive the diffracted first image and the diffracted second image at a final focal plane from the spectrometer and then output a 2-dimensional image of the diffracted first image and the diffracted second image.

2. The multi field of view hyperspectral imaging device of claim 1, wherein the slit has the first opening separated from the second opening by more than a diffracted field at the final focal plane.

3. The multi field of view hyperspectral imaging device of claim 1, wherein the spectrometer comprises a diffraction grating that receives the trimmed first image and the trimmed second image and outputs the diffracted first image and the diffracted second image.

4. The multi field of view hyperspectral imaging device of claim 3, wherein the diffraction grating is configured with a diffraction efficiency that prevents an overlap of the diffracted first image and the diffracted second image.

5. The multi field of view hyperspectral imaging device of claim 1, wherein the spectrometer is a semi-symmetric spectrometer, an Offner spectrometer, or a Dyson spectrometer.

6. The multi field of view hyperspectral imaging device of claim 1, wherein the spectrometer is an Offner spectrometer that comprises a first mirror that receives the trimmed first image and the trimmed second image from the first opening and the second opening, a diffraction grating that receives the trimmed first image and the trimmed second image reflected from the first mirror and outputs the diffracted first image and the diffracted second image, a second mirror that receives the diffracted first image and the diffracted second image from the diffraction grating and reflects the diffracted first image and the diffracted second image to the 2-dimensional detector.

7. The multi field of view hyperspectral imaging device of claim 1, wherein the 2-dimensional detector comprises filters to prevent an overlap of the diffracted first image and the diffracted second image.

8. The multi field of view hyperspectral imaging device of claim 1, wherein the first fore optic and the second fore optic have same magnifications.

9. The multi field of view hyperspectral imaging device of claim 1, wherein the first fore optic and the second fore optic have different magnifications such that the first fore optic has a wide field of view and the second fore optic has a narrow field of view.

10. The multi field of view hyperspectral imaging device of claim 9, further comprising a steering mirror associated with the second fore optic, wherein the first fore optic with the wide field of view leads in a time domain with respect to the second fore optic with the narrow field of view which enables one to look in the wide field of view for a specific spectral signature and when find the specific spectral signature control the steering mirror to position the narrow field of view to focus on the specific spectral signature.

11. The multi field of view hyperspectral imaging device of claim 1, further comprising a shutter wherein the shutter is controlled to activate only one field of view at a time from either the first fore optic or the second fore optic.

12. The multi field of view hyperspectral imaging device of claim 1, further comprising at least one more fore optic, at least one more fold mirror, the slit comprising at least one more opening, and the 2-dimensional detector outputs the 2-dimensional image with at least one more diffracted image.

13. A method for using a multi field of view hyperspectral imaging device to image a remote object, the method comprising the steps of:
    providing the multi field of view hyperspectral imaging device which comprises:
        a first fore optic that receives a first image from a first portion of the remote object;
        a second fore optic that receives a second image from a second portion of the remote object;
        a first fold mirror;
        a second fold mirror;
        a slit comprising a first opening and a second opening, wherein the first fore optic is associated with the first fold mirror which receives the first image from the first fore optic and directs the first image directly to the first opening which outputs a trimmed first image, and wherein the second fore optic is associated with the second fold mirror which receives the second image from the second fore optic and directs the second image directly to the second opening which outputs a trimmed second image;
        a spectrometer positioned to receive the trimmed first image from the first opening and output a diffracted first image and to receive the trimmed second image from the second opening and output a diffracted second image; and
        a 2-dimensional detector positioned to receive the diffracted first image and the diffracted second image at a final focal plane from the spectrometer and then output a 2-dimensional image of the diffracted first image and the diffracted second image; and controlling the first fore optic and the second fore optic to obtain the 2-dimensional image of the diffracted first image and the diffracted second image.

14. The method of claim 13, wherein the slit has the first opening separated from the second opening by more than a diffracted field at the final focal plane.

15. The method of claim 13, wherein the spectrometer comprises a diffraction grating that receives the trimmed first image and the trimmed second image and outputs the diffracted first image and the diffracted second image.

16. The method of claim 15, wherein the diffraction grating is configured with a diffraction efficiency that prevents an overlap of the diffracted first image and the diffracted second image.

17. The method of claim 13, wherein the spectrometer is a semi-symmetric spectrometer, an Offner spectrometer, or a Dyson spectrometer.

18. The method of claim 13, wherein the spectrometer is an Offner spectrometer that comprises a first mirror that receives the trimmed first image and the trimmed second image from the first opening and the second opening, a diffraction grating that receives the trimmed first image and the trimmed second image reflected from the first mirror and outputs the diffracted first image and the diffracted second image, a second mirror that receives the diffracted first image and the diffracted second image from the diffraction grating and reflects the diffracted first image and the diffracted second image to the 2-dimensional detector.

19. The method of claim 13, wherein the 2-dimensional detector comprises filters to prevent an overlap of the diffracted first image and the diffracted second image.

20. The method of claim 13, wherein the first fore optic and the second fore optic have same magnifications.

21. The method of claim 13, wherein the first fore optic and the second fore optic have different magnifications such that the first fore optic has a wide field of view and the second fore optic has a narrow field of view.

22. The method of claim 21, wherein the multi field of view hyperspectral imaging device further comprising a steering mirror associated with the second fore optic, wherein the first fore optic with the wide field of view leads in a time domain with respect to the second fore optic with the narrow field of view which enables one to look in the wide field of view for a specific spectral signature and when find the specific spectral signature control the steering mirror to position the narrow field of view to focus on the specific spectral signature.

23. The method of claim 13, wherein the multi field of view hyperspectral imaging device further comprising a shutter wherein the shutter is controlled to activate only one field of view at a time from either the first fore optic or the second fore optic.

24. The method of claim 13, wherein the multi field of view hyperspectral imaging device further comprising at least one more fore optic, at least one more fold mirror, the slit comprising at least one more opening, and the 2-dimensional detector outputs the 2-dimensional image with at least one more diffracted image.

25. The multi field of view hyperspectral imaging device of claim 1, further comprises:
a controller that operatively controls the first fore optic and the second fore optic to have same field of views which are staggered in a time domain or to have different field of views;
the first fold mirror is an adjustable first fold mirror and the second fold mirror is an adjustable second fold mirror; and
the adjustable first fold mirror and the adjustable second fold mirror are adjusted to align the same field of views with respect to one another or to align the different field of views with respect to one another prior to directing the first image and the second image respectively to the first opening and the second opening of the slit.

26. The multi field of view hyperspectral imaging device of claim 1, wherein the first opening of the slit has a width that is different than a width of the second opening of the slit.

27. The method of claim 13, further comprises:
controlling, by a controller, the first fore optic and the second fore optic to have same field of views which are staggered in a time domain different field of views or to have different field of views;
the first fold mirror is an adjustable first fold mirror and the second fold mirror is an adjustable second fold mirror; and
adjusting the adjustable first fold mirror and the adjustable second fold mirror to align the same field of views with respect to one another or to align the different field of views with respect to one another prior to directing the first image and the second image respectively to the first opening and the second opening of the slit.

28. The method of claim 13, wherein the first opening of the slit has a width that is different than a width of the second opening of the slit.

* * * * *